United States Patent
Saballus et al.

(10) Patent No.: US 11,275,621 B2
(45) Date of Patent: Mar. 15, 2022

(54) DEVICE AND METHOD FOR SELECTING TASKS AND/OR PROCESSOR CORES TO EXECUTE PROCESSING JOBS THAT RUN A MACHINE

(71) Applicant: Robert Bosch GmbH, Stuttgart (DE)

(72) Inventors: Bjoern Saballus, Remseck am Neckar (DE); Elmar Ott, Dorfprozelten (DE); Jascha Friedrich, Lohr am Main (DE); Juergen Bregenzer, Wuerzburg (DE); Simon Kramer, Leonberg (DE); Michael Pressler, Karlsruhe (DE); Sebastian Stuermer, Obersinn (DE)

(73) Assignee: Robert Bosch GmbH, Stuttgart (DE)

(*) Notice: Subject to any disclaimer, the term of this patent is extended or adjusted under 35 U.S.C. 154(b) by 274 days.

(21) Appl. No.: 16/349,863

(22) PCT Filed: Nov. 8, 2017

(86) PCT No.: PCT/EP2017/078580
§ 371 (c)(1),
(2) Date: May 14, 2019

(87) PCT Pub. No.: WO2018/091329
PCT Pub. Date: May 24, 2018

(65) Prior Publication Data
US 2019/0340034 A1 Nov. 7, 2019

(30) Foreign Application Priority Data
Nov. 15, 2016 (DE) .................... 10 2016 222 375.5

(51) Int. Cl.
*G06F 9/46* (2006.01)
*G06F 9/50* (2006.01)

(52) U.S. Cl.
CPC ............ *G06F 9/5038* (2013.01); *G06F 9/505* (2013.01); *G06F 9/5083* (2013.01)

(58) Field of Classification Search
CPC ....... G06F 9/5038; G06F 9/505; G06F 9/5083
(Continued)

(56) References Cited

U.S. PATENT DOCUMENTS 5,872,972 A * 2/1999 Boland ................ G06F 9/5033
718/102
5,898,870 A * 4/1999 Okuda .................... G06F 9/505
718/104
(Continued)

FOREIGN PATENT DOCUMENTS

JP 2004213625 A * 7/2004 ............. G06F 9/505

OTHER PUBLICATIONS

English Translation of JP-2004213625-A (Year: 2004).*
(Continued)

*Primary Examiner* — Bradley A Teets
(74) *Attorney, Agent, or Firm* — Norton Rose Fulbright US LLP; Gerard Messina

(57) ABSTRACT

A device and a method for operating a computer system, a job to be processed by the computer system being assignable to a task from a plurality of tasks for processing, the job to be processed being assigned as a function of a result of a comparison, a first value being compared to a second value in the comparison, the first value characterizing a first computing expenditure, which is to be expected in the computer system in the processing of the job to be processed in a first task of the plurality of tasks, the second value characterizing a second computing expenditure, which is to be expected in the computer system in the processing of the job to be processed in a second task of the plurality of tasks.

16 Claims, 2 Drawing Sheets

(58) Field of Classification Search
USPC .......................................................... 718/100
See application file for complete search history.

(56) References Cited

U.S. PATENT DOCUMENTS

| | | | |
|---|---|---|---|
| 9,336,057 B2* | 5/2016 | He | G06F 9/5094 |
| 9,584,588 B2* | 2/2017 | Mehta | H04L 41/5025 |
| 2004/0054999 A1* | 3/2004 | Willen | G06F 9/5044 |
| | | | 718/103 |
| 2006/0095908 A1 | 5/2006 | Norton et al. | |
| 2008/0046895 A1* | 2/2008 | Dillenberger | G06F 9/505 |
| | | | 718/105 |
| 2009/0187915 A1* | 7/2009 | Chew | G06F 9/5033 |
| | | | 718/104 |
| 2011/0161294 A1* | 6/2011 | Vengerov | G06F 16/275 |
| | | | 707/637 |
| 2012/0066683 A1 | 3/2012 | Srinath | |
| 2013/0179891 A1* | 7/2013 | Dickens | G06F 9/505 |
| | | | 718/104 |
| 2013/0247068 A1* | 9/2013 | Min | G06F 9/5088 |
| | | | 718/105 |
| 2015/0205614 A1* | 7/2015 | Lahteenmaki | G06F 9/505 |
| | | | 712/215 |
| 2016/0092268 A1* | 3/2016 | Gleyzer | G06F 9/46 |
| | | | 718/107 |

OTHER PUBLICATIONS

International Search Report for PCT/EP2017/078580, dated Apr. 11, 2018.
Wikipedia: Shortest Job Next. <http://en.wikipedia.org/w/index.php?title=shortestjob_next&oldid:::719863518> (Downloaded May 13, 2019).

* cited by examiner

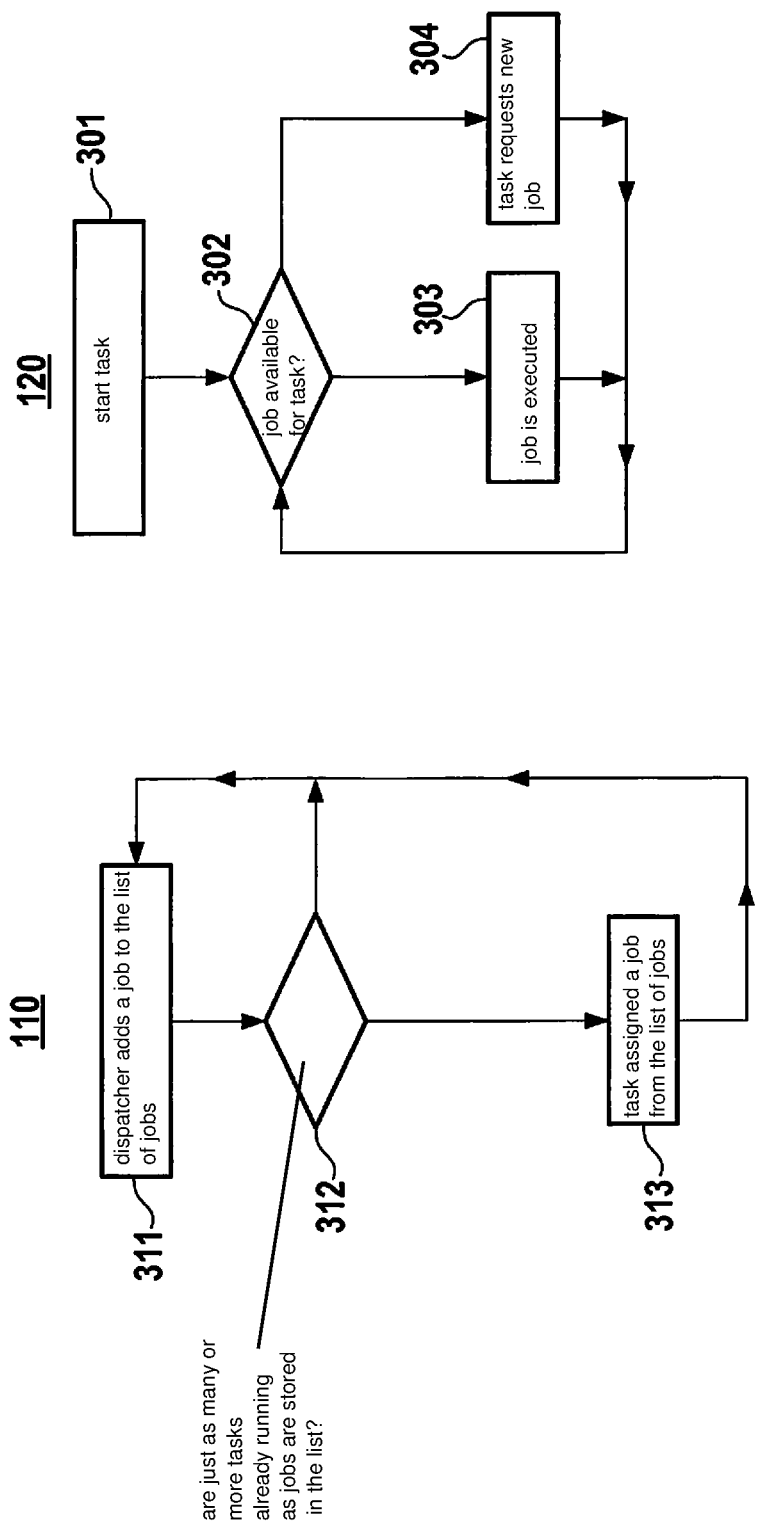

DEVICE AND METHOD FOR SELECTING TASKS AND/OR PROCESSOR CORES TO EXECUTE PROCESSING JOBS THAT RUN A MACHINE

BACKGROUND INFORMATION

In embedded computer systems having multiple processor cores and hard real-time requirements, tasks are assigned to jobs according to static specifications for processing by the embedded computer system. A task to be executed is assigned to one of the processor cores having sufficient processing power. The task to be executed is also provided with sufficient processing time in the processor core. Pending jobs are processed either individually or successively in respective tasks.

For example, known recurrent internal events may trigger such jobs. For processing these jobs, tasks are started periodically, for example. Known urgent or important internal events may trigger jobs also via interrupts or sporadically. These jobs may be processed in tasks that are started specifically for processing such jobs. Internally, this means that in this case the events concern processes in the embedded computer system and that it is possible to plan the occurrence of the events or that they are at least statistically predictable. It is thus likewise possible to plan or at least statistically predict the assignment of the processing time and of the processor cores to the tasks.

In order satisfy the real-time requirements in embedded computer systems, jobs that are triggered asynchronously by external events are likewise planned in advance by static specifications. Real-time requirements for example are requirements with respect to the period of time until a job is processed. If the embedded computer system controls a machine, this period of time depends for example on the dynamics required for controlling the machine.

In order to satisfy the real-time requirements in embedded computer systems, a dynamic assignment of asynchronously occurring jobs is avoided since without static predictability the real-time requirements are possibly no longer satisfiable. Critical factors with respect to the execution of tasks are a mutual interference in the processing of real-time-critical tasks and/or an additional processing time requirement, which is caused by overhead possibly required for starting an additional real-time critical task.

In high-performance systems having multiple processor cores, for example for servers, tasks are started dynamically and distributed to the processor cores in order to process jobs. In the process, however, neither the additional processing time requirement for starting an additional task nor the time required for processing a job are taken into account. Although this results in good execution times on average, it does not fulfill the requirements of a real-time system.

SUMMARY

An improvement in the processing of jobs is therefore desirable.

This improvement may be achieved by a method and a computer system in accordance with the present invention.

Concerning the method for operating a computer system in which a job to be processed by the computer system is assignable to a task from a plurality of tasks for processing, the job to be processed being assigned as a function of a result of a comparison, a first value being compared to a second value in the comparison, the first value characterizing a first computing expenditure, which is to be expected in the computer system in the processing of the job to be processed in a first task of the plurality of tasks, the second value characterizing a second computing expenditure, which is to be expected in the processing of the job to be processed in a second task of the plurality of tasks. For processing a job, various tasks may already be running on the computer system or may be started for this purpose. Different tasks may result in different computing expenditures in the computer system. The additional computing expenditure, which different tasks for processing a job probably entail, is taken into account by the comparison involved in assigning new jobs. It is thus readily possible to choose an improved assignment for the execution time of the processing of jobs in the computer system.

Preferably it is possible to assign to the task a plurality of processor cores, one of the processor cores being assigned as a function of the result of a further comparison, a third value being compared to a fourth value in the further comparison, the third value characterizing a third processing expenditure, which is to be expected in the computer system in the processing of the job to be processed in a first processor core of the plurality of processor cores, the fourth value characterizing a fourth computing expenditure, which is to be expected in the computer system in the processing of the job to be processed in a second processor core of the plurality of processor cores. This additional comparison makes it possible to select a processor core well suited for satisfying the real-time requirement in a simple manner. This makes it possible to improve the execution time of the processing of jobs in the computer system further.

Preferably, the first value, the second value, the third value and/or the fourth value are a function of a load to be expected in the execution of a respective task in the computer system, a computing expenditure to be expected in an initialization of the task in the computer system, an expected execution time of the job and/or a statistical distribution of arrival times of jobs in the computer system. These parameters are particularly well suited in order to change the assignment of jobs to tasks dynamically. The expected computing expenditure, the expected execution time or execution duration are ascertained statistically, for example. The computing expenditure required for initialization, i.e., starting the task, is known since it depends on the computer system for example. It is also possible respectively to use an assumption about a maximum value. These values are ascertained or specified in the operation of the method for example.

Preferably, information about a number of running tasks is compared to information about a number of jobs to be processed. The jobs to be processed are in this case distributed to running tasks as a function of the result of the comparison. Additionally or alternatively, as a function of the result of the comparison, at least one task is started for processing at least one job. The number of running tasks may correspond to the number of jobs to be processed. Then it is possible to assign a task to each job. If the number of running tasks is smaller than the number of running jobs, it is possible either to start a new task or to wait until the new job is processed in an already running task. Depending on the current capacity utilization of one or several of the processor cores and the overhead that is required to start a new task, it is thus possible to choose the one or the other procedure. This makes it possible to adapt the computer system flexibly depending on different job situations and capacity utilization.

Preferably, a task is started for processing a job to be processed if an average run time for processing jobs in the computer system exceeds an average interval between arrival times of the jobs in the computer system, and/or if a processing of a task or multiple tasks results in response times of the computer system that do not correspond to specified requirements. The average run time and average interval are ascertained during the method for example. The specified requirements are determined as a function of a system that is to be controlled. Taking these requirements into account when deciding whether to start a task or not makes it possible to adapt the computer system to the system to be controlled.

Preferably, at least one task checks whether a job is scheduled to be processed by the task. A task is thus able to detect a new job without waiting for signals from outside the computer system, for example after having processed a job. The new job is then able to be processed without delay.

The task preferably checks whether a job for processing by the task is contained in a queue associated with the task or in a list of jobs associated with multiple tasks. It is possible to find either a job from the queue of the task previously assigned to the task or a new job not yet assigned to the task from a general system-wide list of jobs. This job is then able to be processed without delay.

Preferably, at least one signal is used for assigning a job to a task, the at least one signal being designed to determine a task for processing for the execution of a job. A signal, for example a semaphore, is a data structure for synchronizing tasks in the computer system. The semaphore is a particularly well-suited implementation for the single-stage assignment of a job to a task.

Preferably, the at least one signal is designed to determine a start time of processing, the at least one signal being structured either individually, in particular in binary fashion, for each task, or globally for all running tasks. This avoids additional overhead for determining the starting times both when using a signal that is assigned to a specific task as well as for a system-wide signal. The signal is preferably the semaphore.

The computer system has a dispatcher that is designed to assign a job to be processed by the computer system to a task from a plurality of tasks for processing, the job to be processed being assigned as a function of the result of a comparison, a first value being compared to a second value in the comparison, the first value characterizing a first computing expenditure, which is to be expected in the computer system in the processing of the job to be processed in a first task of the plurality of tasks, the second value characterizing a second computing expenditure, which is to be expected in the processing of the job to be processed in a second task of the plurality of tasks. The dispatcher itself if implemented passively. That is to say, the dispatcher does not require tasks of its own and runs in the context of the task that calls the dispatcher. As a result, the dispatcher does not require task resources of its own and additional expenditure for synchronization or coordination is avoided.

Preferably, the computer system comprises a plurality of processor cores, the plurality of processor cores being assignable to the task, one of the processor cores being assigned as a function of the result of a further comparison, a third value being compared to a fourth value in the further comparison, the third value characterizing a third processing expenditure, which is to be expected in the computer system in the processing of the job to be processed in a first processor core of the plurality of processor cores, the fourth value characterizing a fourth computing expenditure, which is to be expected in the computer system in the processing of the job to be processed in a second processor core of the plurality of processor cores.

A computer program designed for implementing the method and a machine-readable memory comprising the computer program are likewise provided.

Further advantageous developments derive from the description below and the figures.

DETAILED DESCRIPTION OF EXAMPLE EMBODIMENTS

Figure 1:
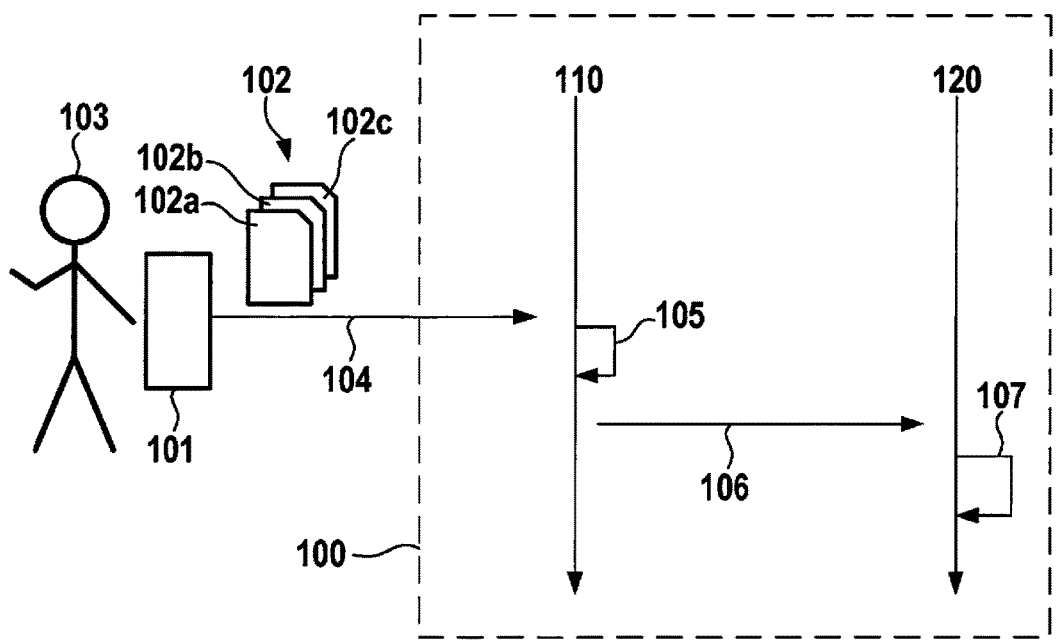
FIG. 1 show parts of a computer system and of a method for processing jobs in a schematic illustration, FIG. 2 show parts of a program sequence according to a first example in a schematic illustration, FIG. 3 show parts of a program sequence according to a second example in a schematic illustration.

FIG. 1 schematically shows parts of a computer system 100 for processing jobs. FIG. 1 also shows schematically steps of a method for processing jobs. Computer system 100 is preferably an embedded computer system 100 that satisfies real-time requirements. The computer system is preferably part of a control unit.

Computer system 100 comprises a microprocessor that is designed to implement the method. The microprocessor has one processor core or multiple processor cores. The microprocessor comprises a dispatcher 110 designed to distribute jobs to tasks 120. Dispatcher 110 controls for example the optimal use of the available tasks 120 and ensures the corresponding flow of information for processing jobs. In the context of the task management of an operating system running on the microprocessor, computing time of the microprocessor is assigned to the individual tasks 120. In this context, dispatcher 110 is used to withdraw access to the computing time from a currently active task 120 and subsequently to assign computing time to the next task 120. The decision as to which task 120 is next is made for example by a scheduler that is called by dispatcher 110 for this purpose. The scheduler is able to assign computing time to tasks 120. If multiple processor cores are provided, the scheduler is able to assign a specific processor core to a task 120.

Computer system 100 is used for example to control a machine. In the case where computer system 100 is used to control the machine, for example, jobs to be executed periodically are provided to control the machine. These jobs are executed by processing in one or multiple tasks 120. A task 120 is executed in a processor core. This means that a program having a sequence of instructions for processing a specific function or tasks with the aid of the microprocessor is executed in a process that is assigned to a processor core for execution. Various tasks 120 may be executed in the same processor core or in multiple processor cores.

Computer system 100 is connected for example to an interface 101 for user interaction. Interface 101 is designed in particular for receiving jobs 102 from a user 103. A user 103 is for example a human being who operates the machine. Interface 101 is for example a computer having a monitor, mouse and/or keyboard for interacting with computer system 100. Another operating system and a program that allows for the interaction are executed on the computer, for example.

Computer system 100 is designed to control a machine, for example.

A first job 102a, for example, is the preparation of a statistics about operating states of the machine. For this purpose, for example, internal data of the microprocessor or data of a sensor situated on the machine are registered and stored by computer system 100.

A second job 102b is for example a retrieval of information about the statistics. For this purpose, stored data of the statistics are accessed.

The connection between interface 101 and computer system 100 may be established via a wireless or wired telecommunication network, in particular via the Transmission Control Protocol and the Internet Protocol. For this purpose, a Hypertext Transfer Protocol interface is preferably provided in computer system 100, which is designed to receive Hypertext Transfer Protocol queries that contain one or multiple jobs. The Hypertext Transfer Protocol interface may also be designed to transmit Hypertext Transfer Protocol responses. Data of the statistics are transmitted as a Hypertext Transfer Protocol response, for example. Jobs 102 may also be transmitted to computer system 100 from a touchscreen connected to computer system 100. In this case the data may be output on the touchscreen.

Dispatcher 110 is designed to receive jobs 102 that are received from interface 101. The processor core or the processor cores are designed to execute tasks that must be processed in order to execute jobs. A task 120 may have been started already prior to receiving a job or may be started only when needed. Tasks 120 that are already running may be released for a task by dispatcher 110. This means that task 120 is authorized by dispatcher 110 to process jobs. This does not necessarily mean that task 120 already processes tasks immediately. The scheduler may be designed to assign computing time only to released tasks 120. If multiple processor cores are provided, the scheduler may be designed to assign a specific processor core only to a released task 120.

Dispatcher 110, the scheduler and tasks 120 are for example programs implemented in software or firmware with instructions that are executed by the microprocessor. The software or firmware is stored in executable fashion in computer system 100.

The method for processing jobs begins in the example with the reception of a job 102 from interface 101. The method is explained in the following with reference to dispatcher 110 and a task 120. An application of the method using multiple tasks 120 is likewise possible. In this case, the distribution of jobs 102 to tasks 120 described below for a task 120 proceeds analogously.

Dispatcher 110 receives first job 102a in a message 104. First job 102a is initiated for example by user 103 or another external source.

First job 102a is received by dispatcher 110 in a step 105. This means that information about first job 102a, which is contained in message 104, is stored in computer system 100 for example. Additionally, a reference to the information, for example to the memory location of the information, may be stored in a list of jobs.

The list of jobs may already contain references to jobs other than first job 102a. In this case, the reference to first job 102a is added for example to the end of the list. The list already contains for example references to jobs that were triggered via interrupts already prior to the reception of first job 102a. These may also be references to jobs to be executed periodically or other jobs to be executed sporadically.

Step 105 is repeated if further jobs 102 are received. The second job 102b and a third job 102c are received for example. This results in corresponding references in the list.

With a message 106, dispatcher 110 assigns one of the jobs to be processed to a task 120. Preferably, the job at the beginning of the list is assigned first. In the example, the assignment also signifies the assignment to a processor core, for processing the job. Accordingly, dispatcher 110 distributes a multitude of jobs to tasks 120. There may also be a provision to distribute a job to one of multiple available tasks 120 or processor cores. If a job was assigned to a task 120 for processing, the reference to the job is marked accordingly in the list.

Dispatcher 110 controls the distribution of the jobs to tasks 120 via signals, for example, in particular semaphores. A data structure for synchronizing tasks 120 in computer system 100 is used for example as a signal, in particular as a semaphore. Jobs may be processed by a task 120 for example if a counter in the data structure indicates that task 120 is released for processing. For this purpose, an integer counter may be used, which is assigned to a specific task 120, is initialized to a maximum value and is reduced by one with each assignment of a job to task 120. In this case, task 120 is not released for processing or is no longer assignable if the counter is at zero. As soon as the job is fully processed, the counter may be increased by one. Dispatcher 110 is designed, for example, to perform the corresponding operations in the data structure. In order to distribute the jobs to tasks 120, dispatcher 110 is designed to use, for example, a current system load of a processor core that executes a task 120, a current system load of other available processor cores that execute tasks 120, information about tasks 120 already being processed or information about tasks 120 to be newly started. It is also possible to use information from a history about comparable situations regarding the processing of the tasks 120 for making the decision. The history includes for example the statistical or time distribution of the arrival times of new jobs and their execution time. The history is ascertained for example during the run time of computer system 100.

For example, depending on system load or history, different strategies are used in order to utilize the microprocessor to capacity in optimized fashion.

A job to be processed by computer system 100 may be assigned, as described, to a task 120 from a plurality of tasks 120. Dispatcher 110 is designed to assign a specific job to precisely one task 120 from the plurality of tasks 120 for processing. For this purpose, parameters are used that characterize a respective computing expenditure in computer system 100. For a first task, a first computing expenditure is ascertained that is to be expected by the processing of the job to be processed in the first task. For a second task, a second computing expenditure is ascertained that is to be expected by the processing of the job to be processed in the second task. For a comparison between the first computing expenditure and the second computing expenditure, a first value characterizing the first computing expenditure is compared to a second value characterizing the second computing expenditure. The first value also characterizes the first task, and the second value also characterizes the second task.

The plurality of tasks 120 may also be assignable to a plurality of processor cores. In this case, it is possible to use, additionally or alternatively, parameters that characterize a respective computing expenditure in computer system 100 that is to be expected in the processing of the job to be processed in a respective task 120 in a respective processor core. For a further comparison between a third computing expenditure incurred when processing in a first processor core and a fourth computing expenditure incurred when processing in a second processor core, a third value is compared to a fourth value. The third value characterizes the third computing expenditure or the first processor core, while the fourth value characterizes the fourth computing expenditure or the second processor core. This means that as a function of the result of the further comparison, one of the processor cores is assigned to the task to which the job to be processed was assigned for processing. It is also possible to use as the third value or fourth value the appropriate first value or second value anew.

The assignment occurs for example as a function of the result of a comparison of parameters of different tasks 120 and/or as a function of the result of a comparison of parameters of different tasks 120. Respective values are determined and compared for multiple tasks and/or multiple processor cores. Preferably, a task or a processor core is ascertained and assigned to the job to be processed by determining the maximum or the minimum of all determined values.

The parameters, i.e., the first value, the second value, the third value and/or the fourth value, may depend on a load to be expected in the execution of a respective task 120 in computer system 11, on a computing expenditure to be expected in an initialization of the task 120 in computer system 100, on an expected execution time of the job and/or a statistical distribution of arrival times of jobs in computer system 100.

There may also be a provision for dispatcher 110 and a task 120 to interact for distributing the jobs. The interaction is described below with reference to FIGS. 2 and 3.

The processing of the job in a task 120 occurs after the distribution in a step 107, in the example in task 120, to which the job was assigned for processing. In the example, the data required for the statistics are registered and stored for processing first job 102a. For processing second job 102b, the stored data of the statistics are accessed in the example and information about the statistics is output.

Due to first job 102a, second job 102b and/or third job 102c, a distribution of additional jobs 102 to tasks 120 is required in computer system 100. These jobs 102 arise in addition to the already existing jobs that are to be processed periodically. These additional jobs 102 are asynchronous with respect to the already existing jobs. These additional jobs 102 are not statistically predictable and cannot be planned.

In order to be able to react appropriately to such sporadic queries, tasks 120 and dispatcher 110 are able to interact.

Two methods for the interaction of task 120 and dispatcher 110 are described in the following.

Figure 2:
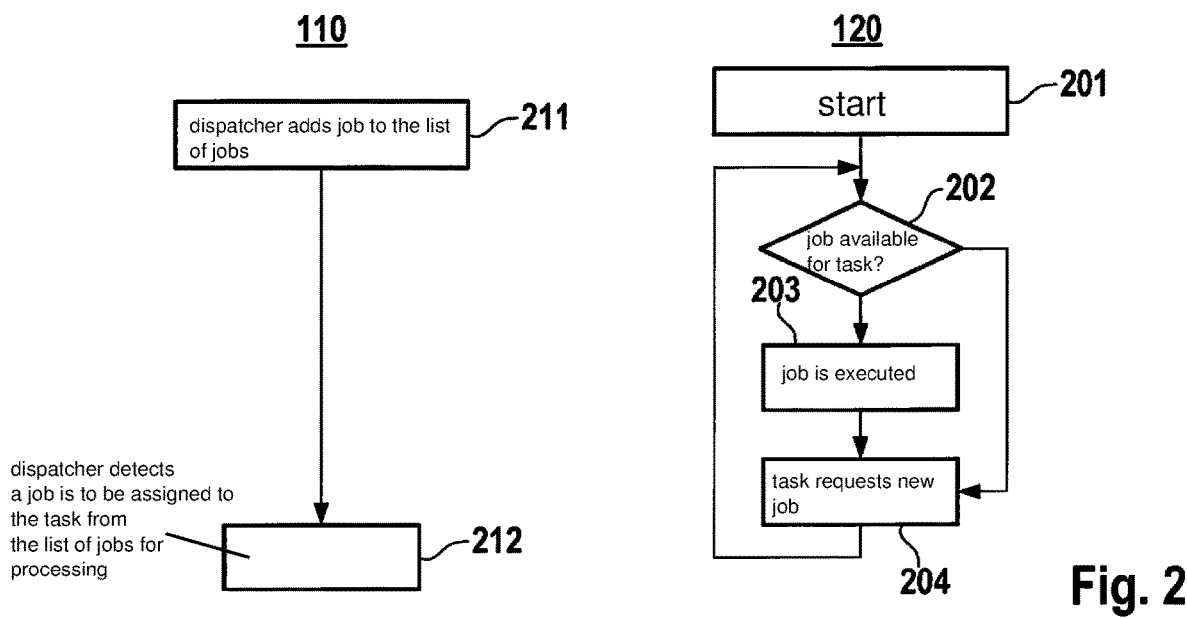

With reference to FIG. 2, a method for the interaction of task 120 and dispatcher 110 is described in which a task 120 checks via a semaphore after each successful processing of a job whether a further job is available for it. The left path of FIG. 2 schematically shows the sequence of the method in dispatcher 110. The right path of FIG. 2 schematically shows the sequence of the method executed in task 120.

Task 120 is started in a step 201 for example. In the example, dispatcher 110 is executed already when task 120 is started. Previously, while task 120 is started, or subsequently, dispatcher 110 adds a job to the list of jobs in a step 211. Information about pending jobs is contained in the list for example. In the example, the list contains a reference to a job. First job 102a or second job 102b are for example added to the list as jobs.

Following step 201, a check is performed in a step 202 to determine whether a job is available for task 120. For this purpose, a check is performed for example to determine whether a job is contained in a queue for jobs that task 210 is to process. The queue contains a job if the job was assigned by dispatcher 110 to task 120 for processing. In the example, first job 102a was already assigned. The assignment itself is described in the following. If the queue contains a job, a step 203 is performed, otherwise a step 204 is performed.

In step 203, the job is executed. First job 102a is executed for example. Subsequently, particularly if first job 102a is executed, step 204 is executed.

In step 204, task 120 requests a new job. For this purpose, the semaphore is used, for example. For example, the value of the counter in the semaphore is the signal for the dispatcher 110 to assign to task 120 a job from the list of jobs for processing. Task 120 is subsequently continued in step 202.

In a step 212, dispatcher 110 detects that the semaphore as a signal indicates that a job is to be assigned to task 120 from the list of jobs for processing. In the example, second job 102a is assigned. The semaphore is used for example in order to increase the value of the counter by one. A job from the list of jobs is assigned to task 120 for example in that the job is added to its queue. There may be a provision to fill the queue with multiple jobs if the capacity of the queue allows for this and if sufficient jobs are contained in the list. Steps 211 and 212 are repeated in the example if a new job reaches dispatcher 110 or if the semaphore gives a corresponding signal.

In the following, another method is described with reference to FIG. 3 regarding the interaction of dispatcher 110 and task 120, in that a task 120 is able to take a job from the list of jobs without the detour via the semaphore, as long as the list contains jobs. The left path of FIG. 3 schematically shows the sequence of the method in dispatcher 110. The right path of FIG. 3 schematically shows the sequence of the method executed in task 120.

Task 120 is started in a step 301 for example. In the example, dispatcher 110 is executed already when task 120 is started.

Following step 301, a check is performed in a step 302 to determine whether a job is available for task 120. For this purpose, a check is performed for example to determine whether the list of jobs contains a job that is to be processed by task 120. The list contains a job for task 120 if the job was assigned by dispatcher 110 to task 120 or to the task type for processing. If the list contains a job, a step 303 is performed, otherwise a step 304 is performed.

In step 303, the job is executed. First job 102a is executed for example. Subsequently, particularly if the job has been executed, step 302 is executed.

In step 304, task 120 requests a new job. For this purpose, the semaphore is used, for example. As described, the semaphore contains the signal for the dispatcher 110 to assign to task 120 a job from the list of jobs for processing. Task 120 is subsequently continued with step 302.

Previously, while task 120 is started in step 301, or subsequently, dispatcher 110 adds a job, as in the example from FIG. 1, to the list of jobs in a step 311. Information about the jobs is contained in the list for example. In the example, the list contains a reference to a job. In this example, the jobs in the list are assigned by the dispatcher to a specific task type or a specific task 120. The assignment to the task type allows various tasks 120, which run in parallel and are able to execute the same job, to access the same list. An assignment occurs for example through a corresponding additional entry in a list element that defines the respective job.

Following step 311, a check is performed in an optional step 312 to determine whether just as many or more tasks 120 are already running as jobs are stored in the list. A check is preferably performed to determine whether more tasks 120 are running that have a specific task type than jobs that require this task type. If just as many or more tasks 120 are already running as jobs are stored in the list, step 311 is carried out. Otherwise, a step 313 is performed. In step 312, dispatcher 110 thus compares the number of running tasks 120 to the number of jobs and distributes the jobs as a function of the result of the comparison. If step 312 is optional, step 313 is executed after step 311.

In step 313, task 120 is assigned a job from the list of jobs, in particular the second job 102b in the example. There may be a provision to assign multiple jobs if the list contains sufficient jobs. Subsequently, a step 311 is performed.

A queue, as in the example from FIG. 2, is not provided in the example from FIG. 3. There may be a provision, however, to implement both possibilities of interaction in one task 120. In this case, it is also possible to store temporarily in the queue multiple jobs received in response to the query of task 120.

Although the overhead is greater in the example shown in FIG. 2 because of a query of the semaphore, the possibility of controlling dispatcher 110 is also greater.

The signals, in particular the semaphores, may have different structures. In particular, individually, i.e., binarily, structured semaphores are used for each task 120 or a globally structured semaphore. For processing a job, semaphores may be designed to determine a task 120 for processing and/or a starting time of the processing. This means that signals, in particular semaphores, may be designed to assign the processing of individual jobs to a specific task 120 and/or to determine a specific starting time for the processing.

Depending on the structure of the signal, in particular of the semaphore, dispatcher 110 is thus able to assign the processing of each individual job to a specific task as well as to determine the starting time in a specific manner. Dispatcher 110 is able to decide whether jobs are passed on immediately or whether a certain number of jobs is first collected. Dispatcher 110 is able to determine how many tasks 120 are maximally processed and how many jobs are processed in succession.

Dispatcher 110 preferably determines the distribution of the jobs as a function of the characteristic of the system that is controlled by the microprocessor, or as a function of properties of the jobs used in this system.

System properties such as a time interval between two jobs, run times for processing jobs, the number of expected new jobs in a time interval, and the overhead that is generated by the operating system when starting a tasks 120, are taken into account for example. Jobs may also be detailed if a current capacity utilization of the system by real-time-critical tasks currently exceeds a threshold value.

For example, in a configuration, in which the jobs are processed successively without additional semaphores, dispatcher 110 releases additional tasks 120 if the average run time for processing jobs exceeds an average interval between the arrival times of the jobs.

For example, in a configuration, in which the jobs are processed successively without additional semaphores, dispatcher 110 releases additional tasks 120 if a processing of tasks 120 results in response times that do not correspond to the desired or needed requirements. The latter may also be hard real-time properties.

Alternatively, it is possible to prevent the further release if the average run time for processing jobs is low and the overhead for starting a task 120 is very high. This reduces the unnecessary capacity utilization of the system with unused tasks 120, reduces the interference of unused tasks 120 with tasks 120 that are required for the internal functionality of the real-time system, and nevertheless maintains a sufficiently fast response time for asynchronous external jobs.

What is claimed is:

1. A method performed by a computer system that includes a plurality of processor cores, the method comprising:
the computer system obtaining a request for performance of one of a plurality of jobs by which the computer system runs a machine;
the computer system selecting, from a plurality of tasks, one or more of the tasks for processing to begin to perform the job, the selection of the one or more tasks being performed as a function of a result of a comparison of a first computing expenditure that is to be expected in the computer system by the performance of the job using, as the selected one or more tasks, a first one or more tasks of the plurality of tasks to a second computing expenditure that is to be expected in the computer system by the performance of the job using, as the selected one or more tasks, a second one or more of tasks of the plurality of tasks;
the computer system selecting, from the plurality of processor cores, one or more of the processor cores to execute the selected one or more tasks, the selection of the one or more processor cores being performed as a function of a result of a comparison of a third computing expenditure that is to be expected in the computer system by the execution of the selected one or more tasks using, as the selected one or more processor cores, a first one or more processor cores of the plurality of processor cores to a fourth computing expenditure that is to be expected in the computer system by the execution of the selected one or more tasks using, as the selected one or more processor cores, a second one or more processor cores of the plurality of processor cores; and
based on the selections, the selected one or more processor cores executing the selected one or more tasks to run the machine;
wherein at least one of the comparisons is based at least in part on an average interval between job performance requests.

2. The method as recited in claim 1, wherein the selection of the one or more tasks is such that the selected one or more tasks include a task to be initialized based on a determination by the computer system that an average run time for performance of the jobs exceeds the average interval between the job performance requests.

3. The method as recited in claim 1, wherein at least one task checks whether a job is scheduled to be processed by the at least one task.

4. The method as recited in claim 3, wherein the at least one task checks whether a job for processing by the at least one task is contained in a queue associated with the at least one task or in a list of jobs associated with multiple tasks.

5. The method as recited in claim 1, wherein at least one signal is used for assigning a job to a task, the at least one signal being designed to determine a task for processing for the execution of a job.

6. The method as recited in claim 5, wherein the at least one signal is designed to determine a start time of processing, the at least one signal being structured either individually in binary fashion, for each task, or globally for all running tasks.

7. The method as recited in claim 1, wherein the at least one of the comparisons is based at least in part on the computing expenditure caused by the processing overhead required for the task initialization over reuse of the already deployed one of the tasks.

8. The method as recited in claim 1, wherein the at least one of the comparisons is based at least in part on an average run time for performance of the jobs.

9. The method as recited in claim 1, wherein the at least one of the comparisons is based at least in part on a comparison of the average interval between job performance requests and an average run time for performance of the jobs.

10. A computer system, comprising one or more processor cores, wherein the computer system is programmed to perform a method, the method comprising:
    obtaining a request for performance of one of a plurality of jobs by which the computer system runs a machine;
    selecting, from a plurality of tasks, one or more of the tasks for processing to begin performance of the job, the selection of the one or more tasks being performed as a function of the result of a comparison of a first computing expenditure that is to be expected in the computer system by the performance of the job using, as the selected one or more tasks, a first one or more tasks of the plurality of tasks to a second computing expenditure that is to be expected in the computer system by the performance of the job using, as the selected one or more tasks, a second one or more tasks of the plurality of tasks; and
    based on the selection, the one or more processor cores executing the selected one or more tasks to run a machine;
    wherein the comparison is based at least in part on an average interval between job performance requests.

11. The computer system as recited in claim 10, wherein:
    the one or more processor cores includes a plurality of processor cores; and
    the method further includes selecting, from the plurality of processor cores, one or more of the processor cores to execute the selected one or more tasks, the selection of the one or more processor cores being performed as a function of a comparison of a third computing expenditure that is to be expected in the computer system by the execution of the selected one or more tasks using, as the selected one or more processor cores, a first one or more processor cores of the plurality of processor cores to a fourth computing expenditure that is to be expected in the computer system by the execution of the selected one or more tasks using, as the selected one or more processor cores, a second one or more processor cores of the plurality of processor cores.

12. The computer system as recited in claim 10, wherein the selection of the one or more tasks is such that the selected one or more tasks include a task to be initialized based on a determination by the computer system that an average run time for performance of the jobs exceeds the average interval between the job performance requests.

13. The computer system as recited in claim 10, wherein the comparison is of the average interval between job performance requests and an average run time for performance of the jobs.

14. A non-transitory machine-readable memory on which is stored a computer program that is executable by a computer system that includes a plurality of processor cores, the computer program, when executed by the computer system, causing the computer system to perform a method, the method comprising:
    the computer system obtaining a request for performance of one of a plurality of jobs by which the computer system runs a machine;
    the computer system selecting, from a plurality of tasks, one or more of the tasks for processing to begin to perform the job, the selection of the one or more tasks being performed as a function of a result of a comparison of a first computing expenditure that is to be expected in the computer system by the performance of the job using, as the selected one or more tasks, a first one or more tasks of the plurality of tasks to a second computing expenditure that is to be expected in the computer system by the performance of the job using, as the selected one or more tasks, a second one or more of tasks of the plurality of tasks;
    the computer system selecting, from the plurality of processor cores, one or more of the processor cores to execute the selected one or more tasks, the selection of the one or more processor cores being performed as a function of a result of a comparison of a third computing expenditure that is to be expected in the computer system by the execution of the selected one or more tasks using, as the selected one or more processor cores, a first one or more processor cores of the plurality of processor cores to a fourth computing expenditure that is to be expected in the computer system by the execution of the selected one or more tasks using, as the selected one or more processor cores, a second one or more processor cores of the plurality of processor cores; and
    based on the selections, the selected one or more processor cores executing the selected one or more tasks to run the machine;
    wherein at least one of the comparisons is based at least in part on an average interval between job performance requests.

15. The non-transitory machine-readable memory as recited in claim 14, wherein the selection of the one or more tasks is such that the selected one or more tasks include a task to be initialized based on a determination by the computer system that an average run time for performance of the jobs exceeds the average interval between the job performance requests.

16. The non-transitory machine-readable memory as recited in claim 14, wherein the at least one of the comparisons is based at least in part on a comparison of the average interval between job performance requests and an average run time for performance of the jobs.

* * * * *